(12) United States Patent
Huang

(10) Patent No.: US 6,739,249 B1
(45) Date of Patent: *May 25, 2004

(54) OFFSET AND SCREEN COMBINATION PRINTING METHOD

(75) Inventor: Jui Peng Huang, Taipei (TW)

(73) Assignee: Taiyi Precision Tech Corp., Taipei (TW)

( * ) Notice: Subject to any disclaimer, the term of this patent is extended or adjusted under 35 U.S.C. 154(b) by 0 days.

This patent is subject to a terminal disclaimer.

(21) Appl. No.: 10/364,092

(22) Filed: Feb. 12, 2003

(51) Int. Cl.$^7$ ................................. B41M 1/14
(52) U.S. Cl. ............... 101/211; 101/129; 101/483; 101/488
(58) Field of Search ................... 101/114, 129, 101/211, 483, 487, 492, 424.1, 488

(56) References Cited

U.S. PATENT DOCUMENTS

| | | | | |
|---|---|---|---|---|
| 3,917,768 A | * | 11/1975 | Abate-Daga et al. | 264/5 |
| 5,343,802 A | * | 9/1994 | Shimada | 101/35 |
| 6,001,292 A | * | 12/1999 | Atake | 264/135 |
| 6,170,881 B1 | * | 1/2001 | Salmon et al. | 283/91 |
| 6,244,183 B1 | * | 6/2001 | Haney et al. | 101/490 |

* cited by examiner

*Primary Examiner*—Ren Yan
(74) *Attorney, Agent, or Firm*—Pro-Techtor International Services

(57) ABSTRACT

An offset and screen combination printing method for IMD (In-Mold Decoration) hot press and injection molding application includes the steps of (1) primary offset printing; (2) color pattern offset printing; (3) third offset printing; (4) screen printing; (5) baking; (6) shape rolling; and (7) injection-molding.

12 Claims, 2 Drawing Sheets

OFFSET AND SCREEN COMBINATION PRINTING METHOD

BACKGROUND OF THE INVENTION

1. Field of the Invention

The present invention relates to a printing technology and, more particularly, to an offset and screen combination printing method for IMD (In-Mold Decoration) hot press and injection molding application.

2. Description of the Related Art

Conventional IMD (In-Mold Decoration) printing methods include screen-printing, spray-printing, and direct injection-molding. Few IMD printing providers accept the method of screen-printing because the printing speed of the method of screen-printing is slow (about 2000 runs per hour), and not suitable for rapid output. The method of spray-printing is complicated. After the application of each color of paint and before the application of a nest color of paint, the workpiece must be dried by baking or with the radiation of a UV lamp. The method of direct injection-molding is the most popularly accepted printing method. According to this direct injection-molding printing method, the desired color pigment is added to the material before IMD hot pressing and injection molding. However, because only one single color is provided each time, this method cannot produce a versatile color pattern.

SUMMARY OF THE INVENTION

The present invention has been accomplished to provide an offset and screen combination printing for IMD (In-Mold Decoration) hot press and injection molding application, which eliminates the drawbacks of the prior art printing methods. According to the present invention, the combination printing method comprises the steps of (1) primary offset printing; (2) color pattern offset printing; (3) third offset printing; (4) screen printing; (5) baking; (6) shape rolling; and (7) injection-molding. By means of the performance of the aforesaid steps and the application of specially prepared compound ink, rapid printing output with versatile printing pattern is achieved.

DETAILED DESCRIPTION OF THE PREFERRED EMBODIMENT

Figure 1:
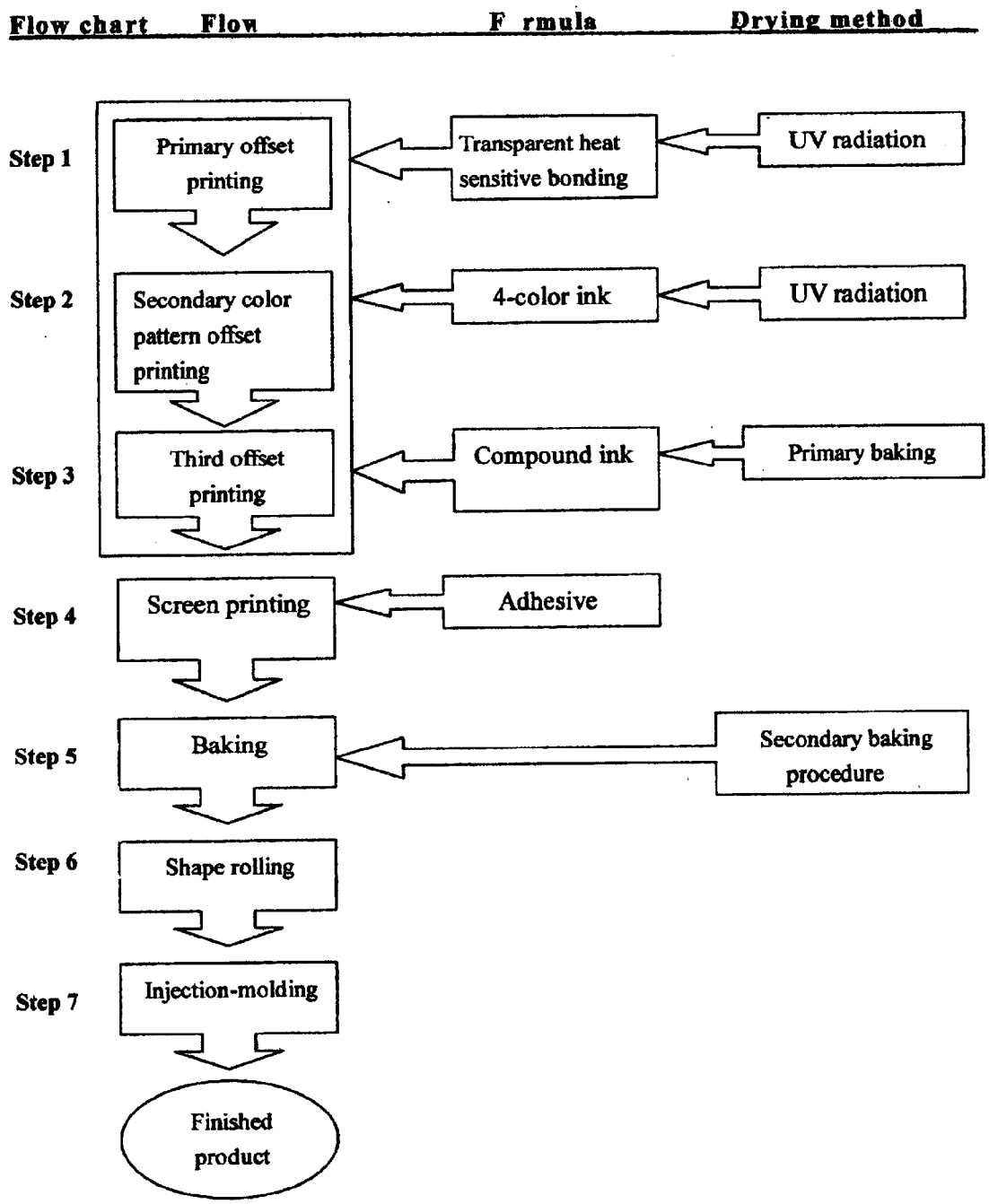
FIG. 1 is a block diagram explaining the procedures of an offset and screen combination printing method according to the present invention.

Referring to FIG. 1, the invention comprises the steps of (1) primary offset printing; (2) color pattern offset printing; (3) third offset printing; (4) screen printing; (5) baking; (6) shape rolling; and (7) injection-molding.

At first, use an offset printer to print a transparent heat sensitive bonding agent on a single piece of film material. The transparent heat sensitive bonding agent is for enabling the printing ink to be used in a further printing procedure to become compatible to the film material. During the primary offset printing procedure, the heat sensitive bonding agent is dried by the radiation of UV of the offset printer at 300° C.

After the first procedure of primary offset printing, the offset printer is operated again to print a 4-color color printing on the layer of bonding agent at the single piece of film material subject to a. predetermined color pattern, and to apply a UV radiation at 300° C. to the color printing.

After the second procedure of color-pattern offset printing, the offset printer is operated again to print a compound ink on the color printing of the single piece of film material thus obtained from the aforesaid second procedure of color-pattern offset printing, and then dry the compound printing through a primary baking procedure. The compound ink is obtained from the mixture of UV ink, transparent heat sensitive bonding agent, hardening agent, and adhesive, After the third procedure of third offset printing, use a screen printing machine to print a bonding agent to the compound ink.

After the fourth procedure of screen printing, the printed single piece of film material is baked to a dry status at about 75°~85° for about 18~25 minutes. The drying temperature and time are determined subject to the material and thickness of the single piece of film material and the nature of the compound ink.

After the fifth procedure of baking, the well-dried single piece of film material thus obtained is put in the steel die of a hot press and pressed and then rolled into a semi-finished product through a shape rolling machine.

After the sixth procedure of shape, rolling, the semi-finished product is put in an injection molding machine and injection-molded with plastics to form the desired finished product.

Figure 2:
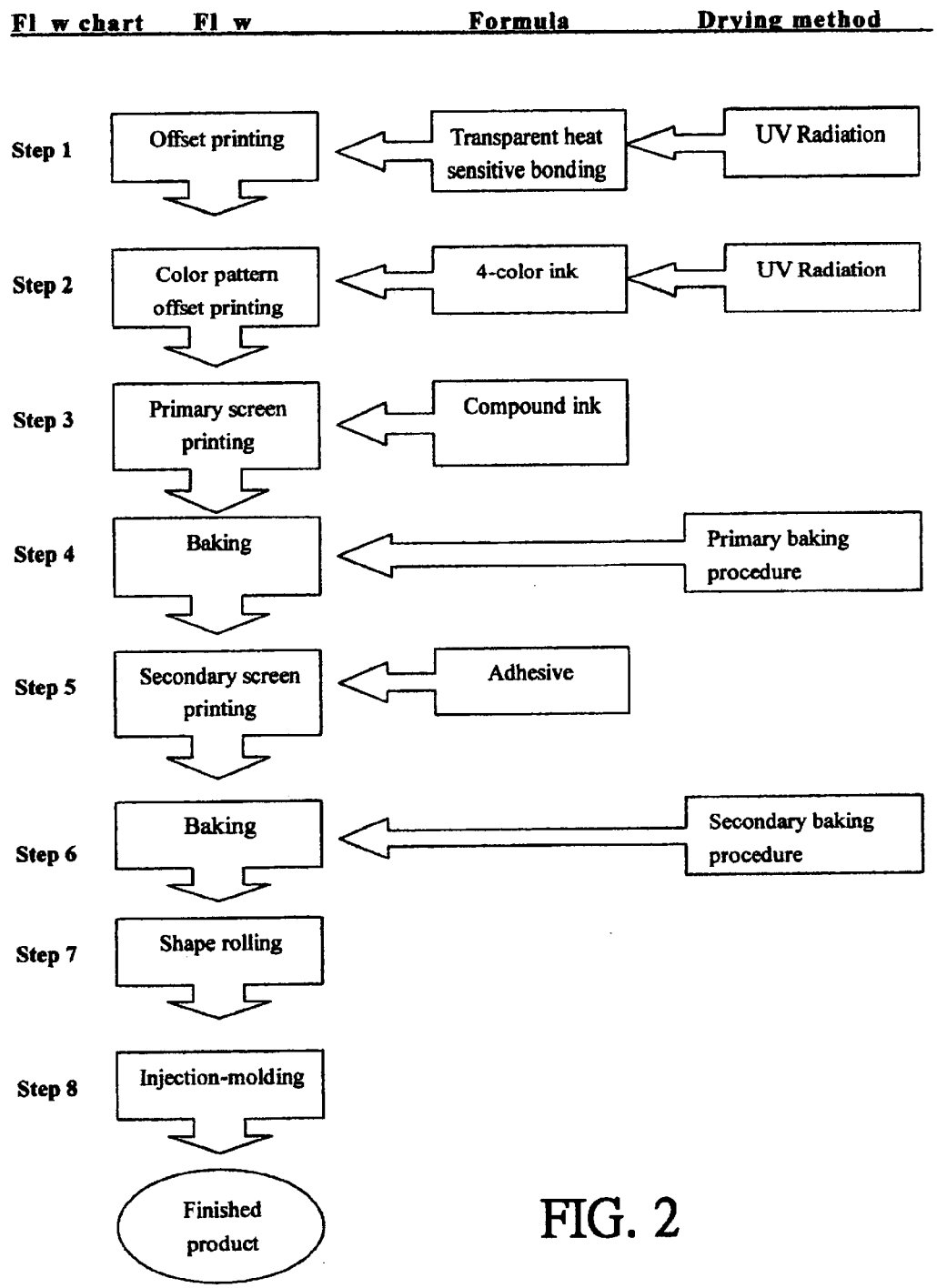
FIG. 2 is a block diagram of an alternate form of the present invention.

FIG. 2 shows an alternate form of the present invention. According to this alternate form, the combination printing method comprises the steps of the invention comprises the steps of (1) primary offset printing; (2) color pattern offset printing; (3) primary screen printing; (4) primary baking; (5) Secondary screen printing; (6) secondary baking; (7) shape rolling; and (8) injection-molding.

At first, use an offset printer to print a transparent heat sensitive bonding agent on a single piece of film material. The transparent heat sensitive bonding agent is for enabling the printing ink to be used in a further printing procedure to become compatible to the film material. During the primary offset printing procedure, the heat sensitive bonding agent is dried by the radiation of UV of the offset printer at 300° C.

After the first procedure of primary offset printing, the offset printer is operated again to print a 4-color color printing on the layer of bonding agent at the single piece of film material subject to a predetermined color pattern, and to apply a UV radiation at 300° C. to the color printing.

After the second procedure of color-pattern offset printing, use a screen printing machine to print a compound ink on the color printing of the single piece of film material thus obtained from the aforesaid second procedure of color-pattern offset printing. The compound ink is obtained from the mixture of UV ink, transparent heat sensitive bonding agent, hardening agent, and adhesive, After the third procedure of primary screen printing, dry the compound printing through a primary baking procedure.

After the fourth procedure of primary baking, third offset printing, use the screen printing machine to print a bonding agent on the compound ink.

After the fifth procedure of secondary screen printing, the printed single piece of film material is baked to a dry status at about 75°~85° for about 18~25 minutes. The drying temperature and time are determined subject to the material and thickness of the single piece of film material and the nature of the compound ink.

After the sixth procedure of secondary baking, the well-dried single piece of film material thus obtained is put in the steel die of a hot press and pressed and then rolled into a semi-finished product through a shape rolling machine.

After the seventh procedure of shape rolling, the semi-finished product is put in an injection molding machine and injection-molded with plastics to form the desired finished product.

A prototype of offset and screen combination printing method has been constructed with the features of FIGS. 1~2. The offset and screen combination printing method functions smoothly to provide all of the features discussed earlier.

Although particular embodiments of the invention have been described in detail for purposes of illustration, various modifications and enhancements may be made without departing from the spirit and scope of the invention. Accordingly, the invention is not to be limited except as by the appended claims.

What the invention claimed is:

1. An offset and screen combination printing method comprising the steps of:
   (a) primary offset printing where a single piece of film material is prepared and a transparent heat sensitive bonding agent is printed on the prepared single piece of film material through an offset printer;
   (b) secondary color pattern offset printing where a 4-color color printing is printed on the layer of bonding agent of the single piece of film material thus obtained through an offset printer;
   (c) third offset printing where an offset printer is operated again to print a compound ink obtained from the mixture of printing ink and heat sensitive bonding agent on the color printing of said single piece of film material, and then the compound ink printed single piece of film material is baked to a dry state;
   (d) screen printing where an adhesive is printed on the layer of compound ink of the single piece of film material thus obtained through a silk screen;
   (e) baking where the bonding agent printed single piece of film thus obtained is dried by baking;
   (f) shape rolling where the printed single piece of film material thus obtained is put in the steel die of a hot press and pressed and then shape-rolled into a semi-finished product through a shape rolling machine; and
   (g) injection-molding where the shape-rolled semi-finished product thus obtained is injection-molded with plastics into the desired finished product.

2. The offset and screen combination printing method as claimed in claim 1 wherein said compound ink comprises UV ink, a transparent heat sensitive bonding agent, a hardening agent, and an adhesive.

3. The offset and screen combination printing method as claimed in claim 1 wherein said transparent heat sensitive bonding agent is dried with the application of UV radiation at 300° C. during the step (a) primary offset printing.

4. The offset and screen combination printing method as claimed in claim 1 wherein said color printing is dried with the application of UV radiation at 300° C. during the step (b) secondary color pattern offset printing.

5. The offset and screen combination printing method as claimed in claim 1 wherein said compound ink is dried by baking at about 300° C. for about 18~25 minutes during the step (c) third offset printing.

6. The offset and screen combination printing method as claimed in claim 1 wherein said adhesive is dried by baking at about 300° C. for about 18~25 minutes during the step (e) baking.

7. An offset and screen combination printing method comprising the steps of:
   (a) primary offset printing where a single piece of film material is prepared and a transparent heat sensitive bonding agent is printed on the prepared single piece of film material through an offset printer;
   (b) color pattern offset printing where a 4-color color printing is printed on the layer of bonding agent of the single piece of film material thus obtained;
   (c) primary screen printing where a compound ink prepared from the mixture of printing ink and bonding agent is printed on the color printing of the single piece of film material through an offset printer thus obtained;
   (d) primary baking where the compound ink printed single piece of film material thus obtained is dried by baking;
   (e) secondary screen printing where an adhesive is printed on the layer of compound ink of the single piece of film material thus obtained through a silk screen;
   (f) secondary baking where the adhesive printed single piece of film material thus obtained is dried by baking;
   (g) shape rolling where the printed single piece of film material thus obtained is put in the steel die of a hot press and pressed and then shape-rolled into a semi-finished product through a shape rolling machine; and
   (h) injection-molding where the shape-rolled semi finished product thus obtained is injection-molded with plastics into the desired finished product.

8. The offset and screen combination printing method as claimed in claim 7 wherein said compound ink is comprised of UV ink, a transparent heat sensitive bonding agent, a hardening agent, and an adhesive.

9. The offset and screen combination printing method as claimed in claim 7 wherein said transparent heat sensitive bonding agent is dried with the application of UV radiation at 300° C. during the step (a) primary offset printing.

10. The offset and screen combination printing method as claimed in claim 7 wherein said color printing is dried with the application of UV radiation at 300° C. during the step (b) color pattern J offset printing.

11. The offset and screen combination printing method as claimed in claim 7 wherein said compound ink is dried by baking at about 300° C. for about 18~25 minutes during the step (c) primary screen printing.

12. The offset and screen combination printing method as claimed in claim 7 wherein said adhesive is dried by baking at about 300° C. for about 18~25 minutes during the step (e) secondary screen printing.

* * * * *